(12) United States Patent
Rock et al.

(10) Patent No.: US 7,604,888 B2
(45) Date of Patent: Oct. 20, 2009

(54) STAMPED PEM FUEL CELL PLATE MANUFACTURING

(75) Inventors: Jeffrey A Rock, Fairport, NY (US); Steven J Spencer, Rochester, NY (US); Carl Marsiglio, Spencerport, NY (US)

(73) Assignee: GM Global Technologies Operations, Inc.

( * ) Notice: Subject to any disclaimer, the term of this patent is extended or adjusted under 35 U.S.C. 154(b) by 878 days.

(21) Appl. No.: 10/903,167

(22) Filed: Jul. 30, 2004

(65) Prior Publication Data

US 2006/0024550 A1 Feb. 2, 2006

(51) Int. Cl.
*H01M 2/00* (2006.01)
*H01M 2/02* (2006.01)
*H01M 2/08* (2006.01)
*H01M 2/14* (2006.01)

(52) U.S. Cl. ............................ 429/34; 429/35; 429/38; 429/39

(58) Field of Classification Search .............. 429/34–39
See application file for complete search history.

(56) References Cited

U.S. PATENT DOCUMENTS

| | | | |
|---|---|---|---|
| RE36,148 E | 3/1999 | Strasser | |
| 5,945,232 A | 8/1999 | Ernst et al. | |
| 6,054,228 A | 4/2000 | Cisar et al. | |
| 6,127,058 A | 10/2000 | Pratt et al. | |
| 6,399,232 B1 | 6/2002 | Eshraghi | |
| 6,485,850 B1 | 11/2002 | Tsai et al. | |
| 6,503,653 B2 | 1/2003 | Rock | |
| 2002/0064702 A1* | 5/2002 | Gibb | 429/34 |
| 2002/0132151 A1 | 9/2002 | Choi | |
| 2002/0168560 A1 | 11/2002 | Mukerjee et al. | |
| 2003/0044668 A1 | 3/2003 | Sugita et al. | |
| 2003/0124406 A1* | 7/2003 | Ohtani et al. | 429/34 |
| 2003/0129473 A1* | 7/2003 | Lee et al. | 429/35 |
| 2003/0180594 A1 | 9/2003 | Choi et al. | |
| 2003/0186106 A1* | 10/2003 | Frank et al. | 429/38 |
| 2003/0194591 A1 | 10/2003 | Wariishi et al. | |

FOREIGN PATENT DOCUMENTS

WO 02/093672 A2 11/2002

* cited by examiner

*Primary Examiner*—Dah-Wei D Yuan
*Assistant Examiner*—Steven Scully
(74) *Attorney, Agent, or Firm*—Harness, Dickey & Pierce, P.L.C.

(57) ABSTRACT

A separator plate for a fuel cell is provided including a first support element and a series of second support elements extending from a first surface of the plate. A series of apertures are disposed between the first support element and the series of second support elements for communicating a reactant gas therethrough for delivery to a flow field of the separator plate.

15 Claims, 7 Drawing Sheets

STAMPED PEM FUEL CELL PLATE MANUFACTURING

FIELD OF THE INVENTION

The present invention relates to PEM fuel cells and more particularly to a separator plate configuration.

BACKGROUND OF THE INVENTION

Fuel cells have been used as a power source in many applications. For example, fuel cells have been proposed for use in electrical vehicular power plants to replace internal combustion engines. In proton exchange membrane (PEM) type fuel cells, hydrogen is supplied to the anode of the fuel cell and oxygen is supplied as the oxidant to the cathode. PEM fuel cells include a membrane electrode assembly (MEA) comprising a thin, proton transmissive, non-electrically conductive, solid polymer electrolyte membrane having the anode catalyst on one face and the cathode catalyst on the opposite face. The MEA is sandwiched between a pair of non-porous, electrically conductive elements or separator plates which (1) serve as current collectors for the anode and cathode, and (2) contain appropriate channels and/or openings formed therein for distributing the fuel cell's gaseous reactants over the surfaces of the respective anode and cathode catalysts.

The term "fuel cell" is typically used to refer to either a single cell or a plurality of cells (stack) depending on the context. A plurality of individual cells are typically bundled together to form a fuel cell stack and are commonly arranged in electrical series. Each cell within the stack includes the membrane electrode assembly (MEA) described earlier, and each such MEA provides its increment of voltage. A group of adjacent cells within the stack is referred to as a cluster.

In PEM fuel cells, hydrogen ($H_2$) is the anode reactant (i.e., fuel) and oxygen is the cathode reactant (i.e., oxidant). The oxygen can be either a pure form ($O_2$) or air (a mixture of $O_2$ and $N_2$). The solid polymer electrolytes are typically made from ion exchange resins such as perfluoronated sulfonic acid. The anode/cathode typically comprises finely divided catalytic particles, which are often supported on carbon particles, and mixed with a proton conductive resin. The catalytic particles are typically costly precious metal particles. As such these MEAs are relatively expensive to manufacture and require certain conditions, including proper water management and humidification and control of catalyst fouling constituents such as carbon monoxide (CO), for effective operation.

The electrically conductive plates sandwiching the MEAs may contain an array of grooves in the faces thereof that define a reactant flow field for distributing the fuel cell's gaseous reactants (i.e., hydrogen and oxygen in the form of air) over the surfaces of the respective cathode and anode. These reactant flow fields generally include a plurality of lands that define a plurality of flow channels therebetween through which the gaseous reactants flow from a supply header at one end of the flow channels to an exhaust header at the opposite end of the flow channels.

In a conventional separator plate, passages are defined at identified regions for communicating flow through the plane of the separator plate. Once the flow is communicated to the desired surface of the separator plate, the lands that define the flow channels communicate the flow across the surface of the separator plate. Typically, the passages are arranged on the separator plate at locations passing through elevation changes.

One method for making the separator plate includes forming the elevation changes or lands during a stamping operation. Subsequently, the passages are formed at the desired locations in the stamped plate. The process of forming passages in a plate having pre-formed elevation changes can be difficult and costly.

SUMMARY OF THE INVENTION

The present invention provides a separator plate for a PEM fuel cell including a first support element extending from a planar surface of the separator plate and a second support element extending from the planar surface of the separator plate, wherein the planar surface defines an aperture disposed between the first support element and the second support element for permitting the flow of reactant gas therethrough.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
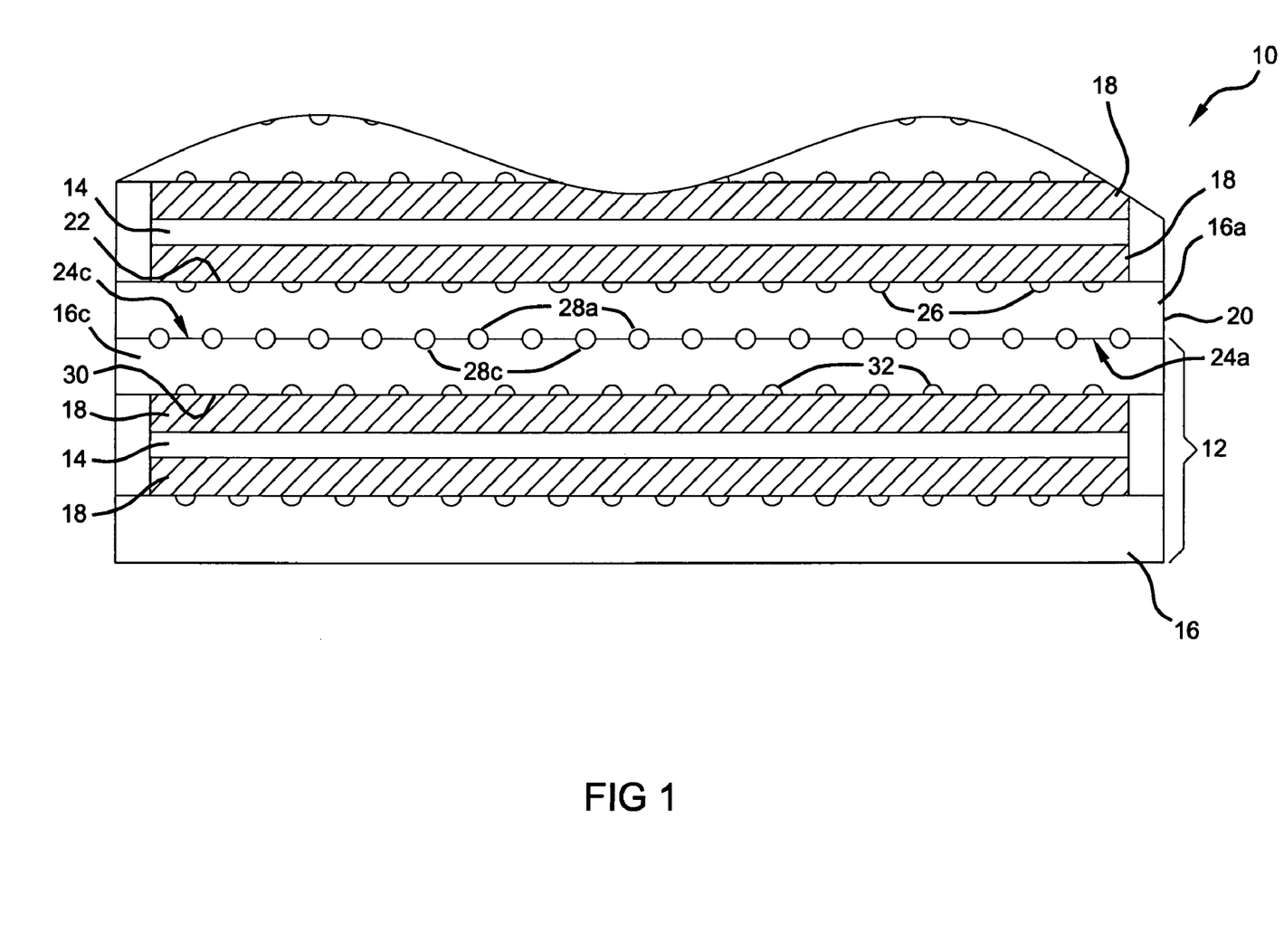
FIG. 1 is a cross-sectional view of a portion of an exemplary fuel cell stack.

With initial reference to FIG. 1, a cross-section of a portion of a fuel cell stack 10 is illustrated. The fuel cell stack 10 includes a series of fuel cells 12. Each fuel cell 12 includes a membrane electrode assembly (MEA) 14 sandwiched between separator plates 16. Diffusion media 18 are disposed between the MEA 14 and each of the separator plates 16. An anode reactant (i.e., hydrogen) and a cathode reactant (i.e., oxygen) are distributed by the separator plates 16 for reaction across the MEA 14.

In one instance, the separator plates 16 are combined as a bipolar plate 20. Each bipolar plate 20 includes an anode separator plate 16a and a cathode separator plate 16c. The anode separator plate 16a has an anode face 22 and a coolant face 24a. An anode flow field 26 is formed in the anode face 22 and a partial coolant flow field 28a is formed in the coolant face 24a. The cathode separator plate 16c includes a cathode face 30 and a coolant face 24c. A cathode flow field 32 is formed in the cathode face 30 and a partial coolant flow field 28c is formed in the coolant face 24c. The anode separator plate 16a and the cathode separator plate 16c are stacked together so the coolant faces 24a and 24c lie adjacent to one another. The partial coolant flow fields 28a and 28c of the coolant faces 24a and 24c align to form fluid channels having a flow field geometry according to the present invention.

As presently preferred, the anode and cathode plates 16a and 16c are metal sheets preferably stainless steel that may be formed by a stamping and forming operation as will be described in greater detail. One skilled in the art will recognize that other suitable materials and manufacturing processes may be utilized for the anode and cathode plates 16a and 16c.

With continued reference to FIG. 1 and further reference to FIGS. 2A-4, the anode plate 16a of the bipolar plate 20 will be described in greater detail. With specific reference to FIG. 2A, the anode plate 16a includes a first reactant inlet header 40 for distributing a first reactant across the bipolar plate 20. A second reactant inlet header 42 is arranged on the anode plate 16a for distributing a second reactant across the bipolar plate 20. A coolant inlet header 44 is in fluid communication with the coolant flow fields 28a and 28c.

Figure 2A:
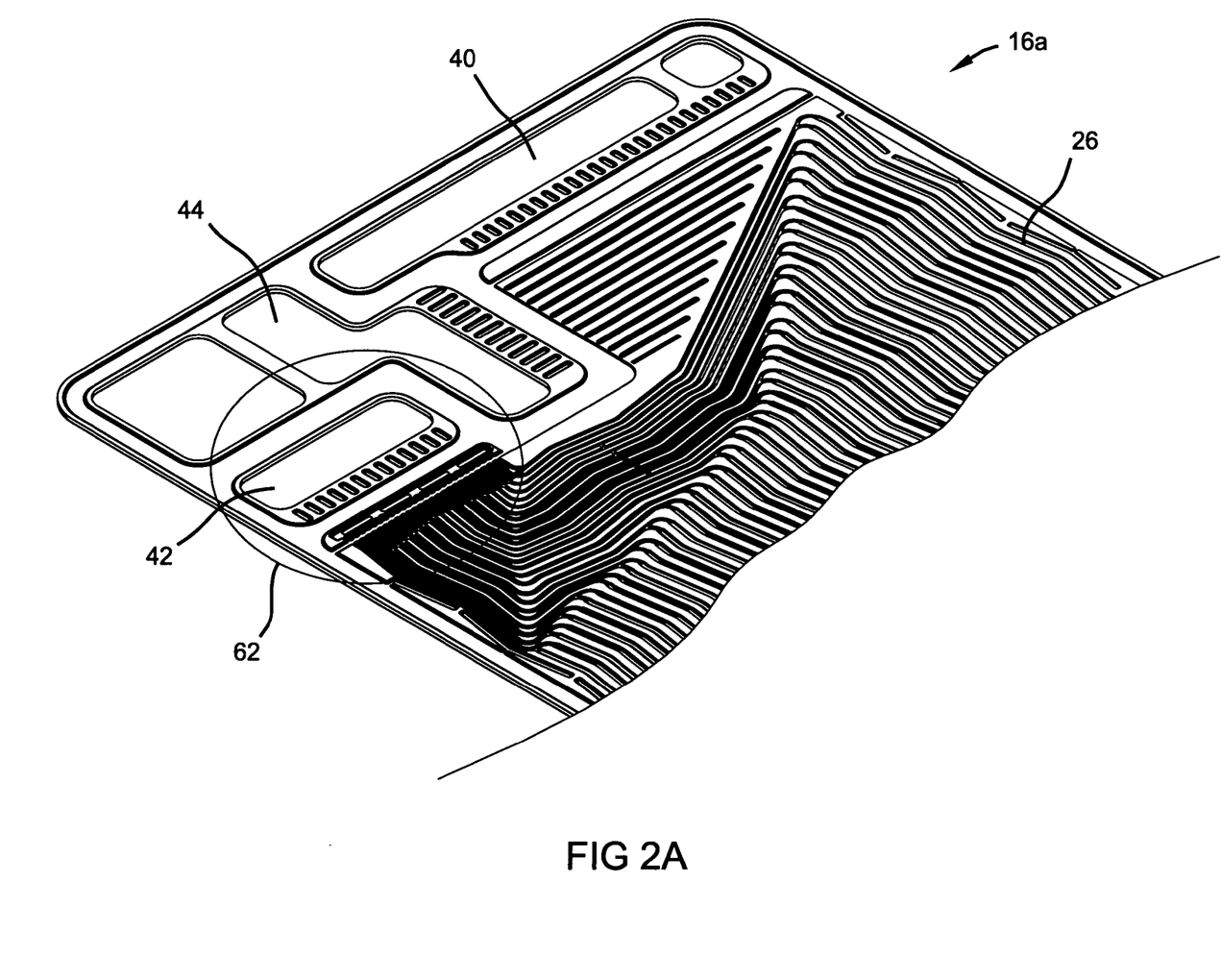
FIG. 2A is a partial perspective view of a separator plate according to the principles of the present invention illustrating a first header portion.
Figure 2B:
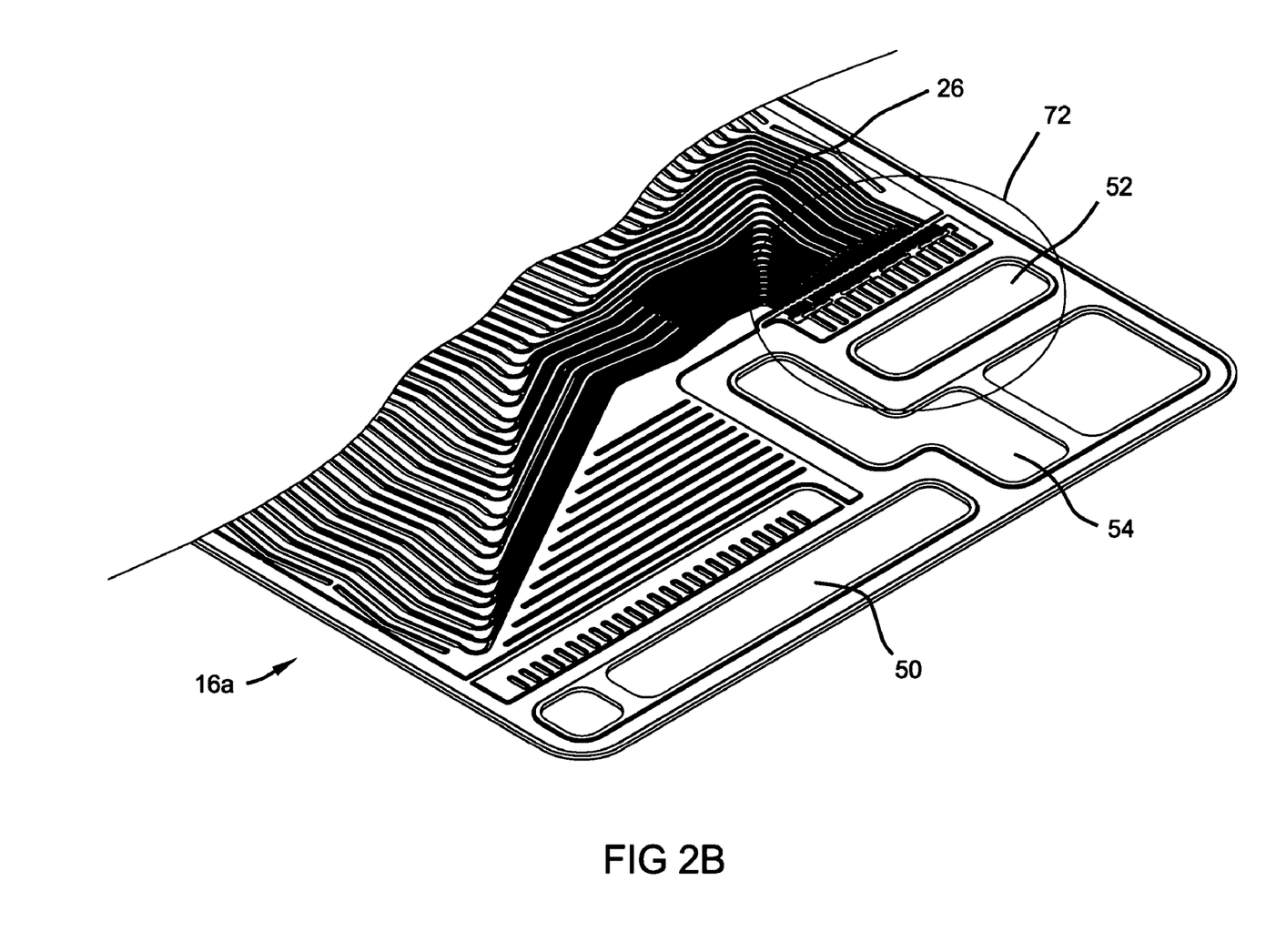
FIG. 2B is a partial perspective view of the separator plate of FIG. 2A illustrating a second header portion.

With specific reference to FIG. 2B, the anode plate 16a includes a first reactant outlet header 50 for exhausting the first reactant, a second reactant outlet header 52, for exhausting the second reactant and a coolant outlet header 54 for exhausting coolant.

Figure 3:
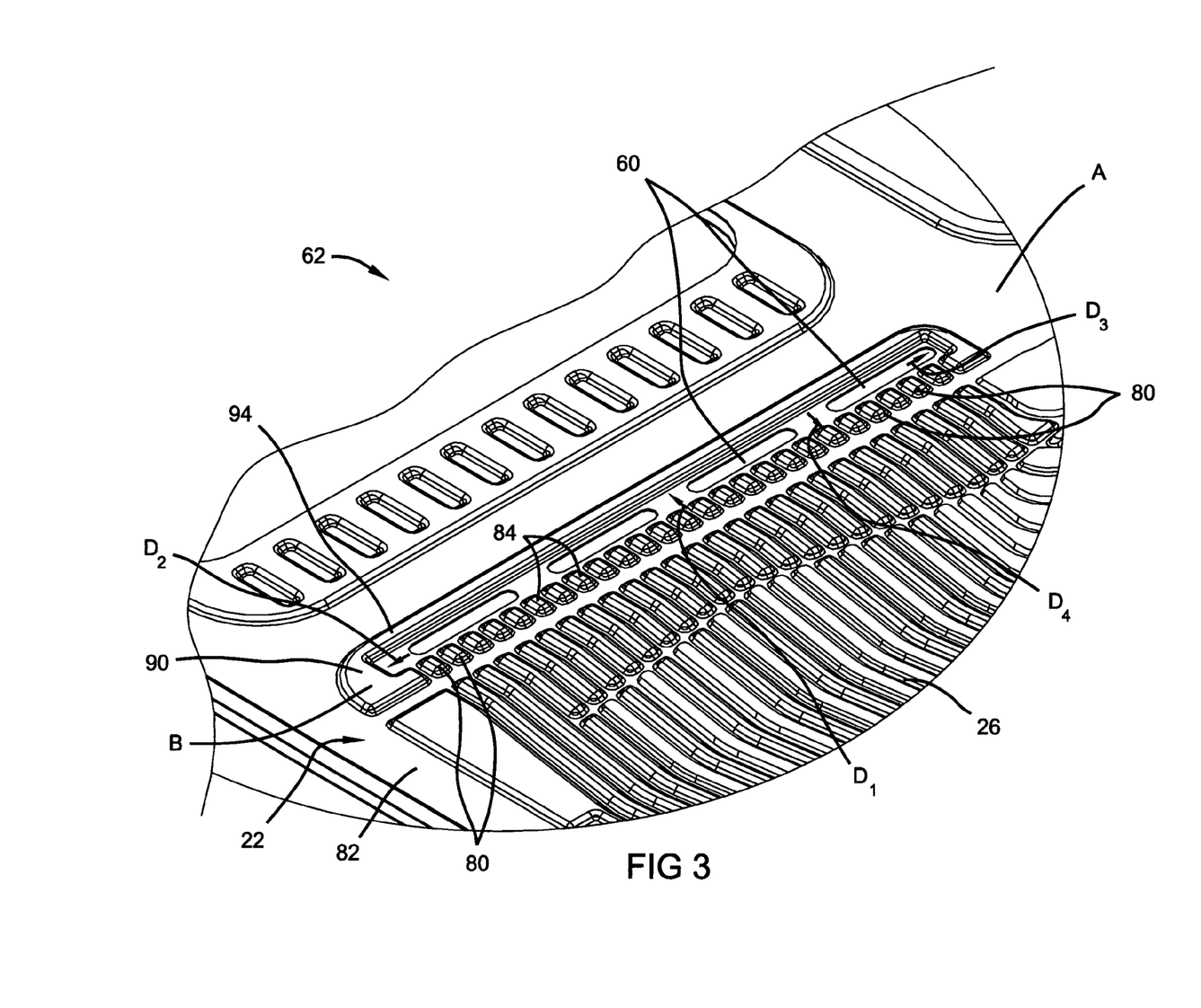
FIG. 3 is a detailed perspective view of an inlet region of the separator plate of FIG. 2A.
Figure 4:
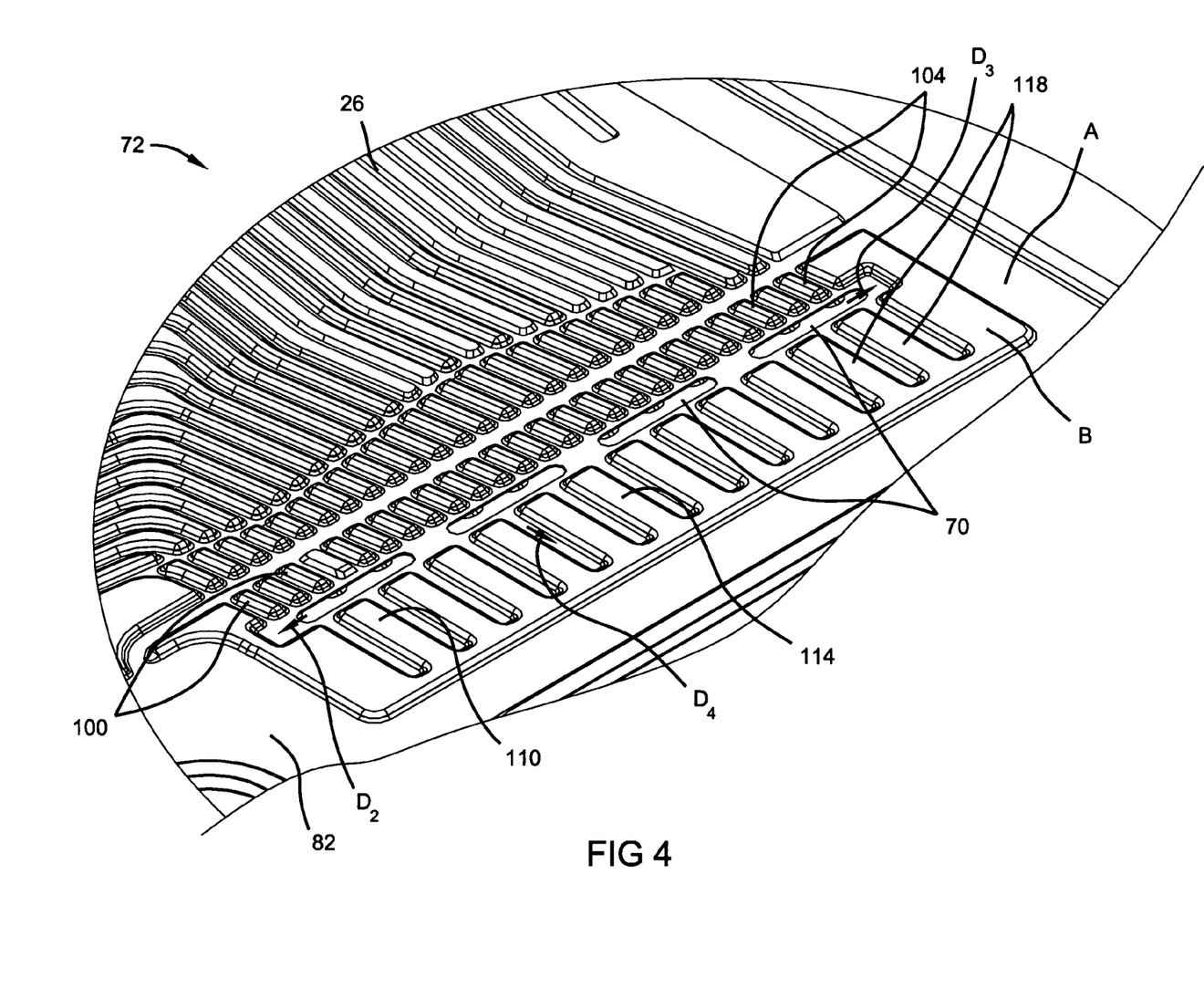
FIG. 4 is a detailed perspective view of an outlet region of the separator plate of FIG. 2B.
Figure 6:
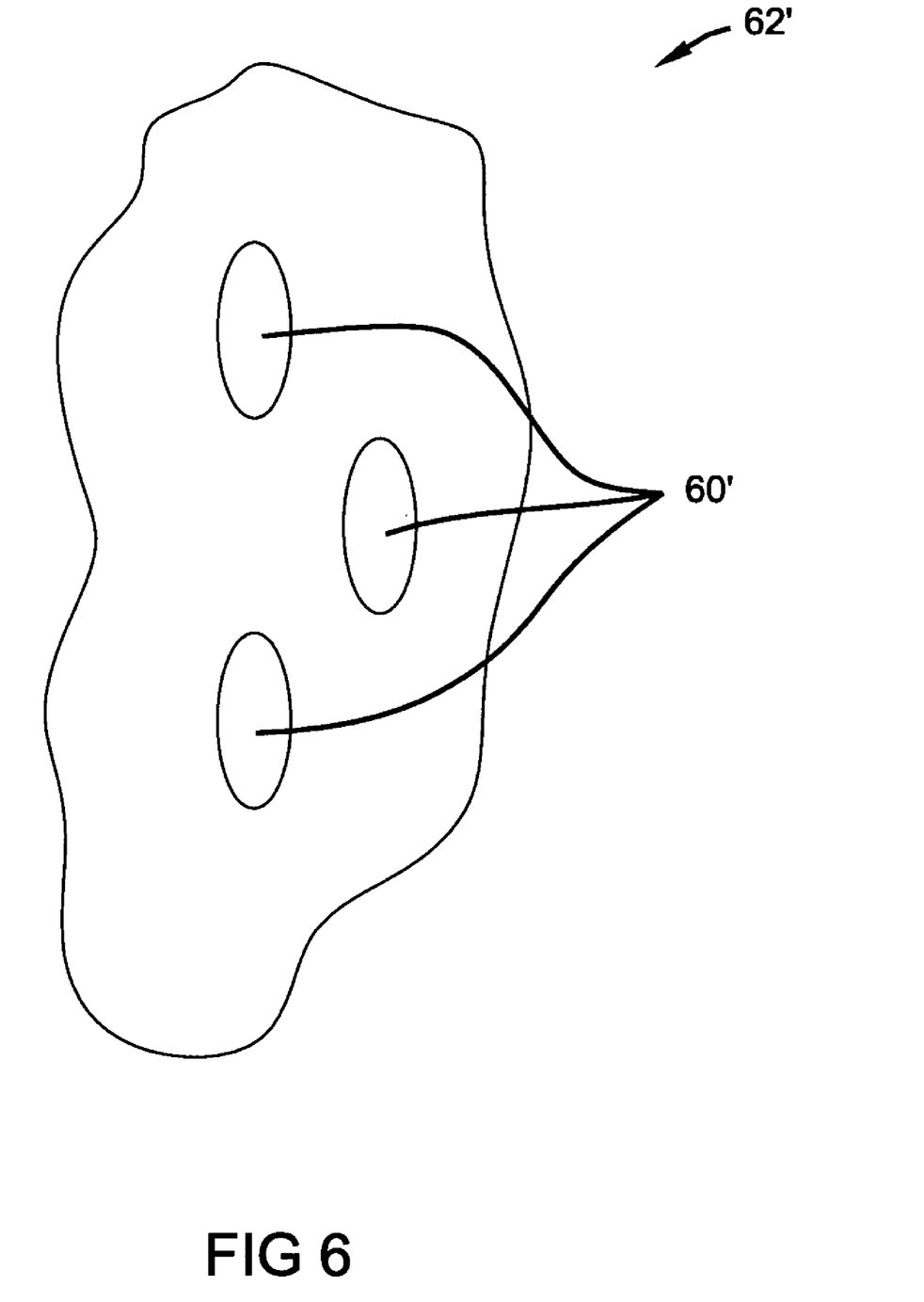
FIG. 6 is a plan view of inlet or outlet apertures according to additional features.

The anode plate 16a is configured to accept the anode reactant gas through inlet aperture or apertures 60 configured at an inlet region 62 in the anode plate 16a (FIG. 3). The inlet apertures 60 are arranged in a generally linear pattern along the anode plate 16a. Likewise, the anode plate 16a includes outlet apertures 70 configured at an outlet region 72 in the anode plate 16a (FIG. 4). The outlet aperture or apertures 70 are arranged in a generally linear pattern along the anode plate 16a. The anode flow field 26 arranged on the anode face 22 is operable to communicate the anode reactant gas from the inlet region 62 to the outlet region 72. The apertures 60 and/or 70 can also be arranged in a staggered pattern or aligned by their minor axis. For example, as illustrated in FIG. 6, inlet apertures 60' are shown staggered in an inlet region 62'.

With specific reference now to FIG. 3, the anode inlet region 62 will be described in greater detail. The anode inlet region 62 includes a series of first support elements 80 arranged in a generally linear pattern adjacent to the inlet apertures 60. The series of first support elements 80 extend from a generally planar first surface 82 of the anode face 22 and terminate at a generally planar second surface 84. The first surface 82 and the second surface 84 define a first and a second plane A and B respectively, spaced from one another. A second support element 90 extends from the planar first surface 82 of the anode face 22 and terminates at a second surface 94. The respective second surfaces 84 and 94 of the first support elements 80 and the second support element 90 are substantially coplanar. As shown, the inlet apertures 60 are interposed between the series of first support elements 80 and the second support element 90. The inlet apertures 60 are formed on the first planar surface 82 of the anode face 22 or in a mid plane surface between the first planar and second planar surfaces 82 and 84.

With specific reference now to FIG. 4, the anode outlet region 72 will be described in greater detail. The anode outlet region 72 includes a series of third support elements 100 arranged in a generally linear pattern adjacent to the outlet apertures 70. The series of third support elements 100 extend from the generally planar first surface 82 of the anode face 22 and terminate at a second surface 104 coplanar to the second plane B. A fourth support element 110 extends from the planar first surface 82 of the anode face 22 and terminates at a second surface 114. The fourth support element 110 is further defined by a plurality of finger portions 118. The respective second surfaces 104 and 114 of the third support elements 100 and the fourth support element 110 are substantially coplanar. As shown, the outlet apertures 70 are interposed between the series of third support elements 100 and the fourth support element 110. The outlet apertures 70 are formed on the first planar surface 82 of the anode face 22 or in a mid plane surface between the first planar and second planar surfaces 82 and 84.

With reference now to FIG. 3, the operation of the anode inlet region 62 will now be described. In operation, the second support element 90 at the anode inlet region 62 is operable to bound reactant gas in a first, second and third direction $D_1$, $D_2$, and $D_3$, as the reactant gas is passed upward through the inlet apertures 60 (as viewed from FIG. 3) and influence the reactant gas in a fourth direction $D_4$ toward the series of first support elements 80. Explained further, the second support element 90 defines a generally U-shaped wall establishing a boundary forcing the reactant gas to pass toward regions of least resistance (in the direction $D_4$) or the areas between the series of first support elements 80. In this way, the reactant gas is directed toward the anode flow field 26.

With reference now to FIG. 4, the operation of the anode outlet region 72 will now be described. In operation, the fourth support element 110 at the anode outlet region 72 is operable to bound reactant gas in the fourth direction $D_4$ as the reactant gas is passed from the anode flow field 26 and between the third series of support elements 100. Explained further, the fourth support element 110 defines a generally U-shaped wall establishing a boundary (in the $D_2$, $D_3$, and $D_4$ directions) forcing the reactant gas to pass toward regions of least resistance or down through the outlet aperture or apertures 70.

The anode plate 20a is comprised of a metal sheet, such as stainless steel for example. The flow field 26 and respective support elements 80, 90, 100 and 110 are formed in the metal sheet during a metal forming operation such as stamping or any other suitable process for shaping sheet metal. Once the desired flow field and support elements are formed in the metal sheet, the inlet and outlet apertures 60 and 70 are pierced in the respective inlet and outlet regions, 62 and 72 respectively. These can be done at the same time or sequentially, and even in the reverse order, pierce then form. The inlet and outlet apertures 60 and 70 are formed by any suitable manufacturing process such as laser cutting for example. The anode plate configuration presents a favorable planar working surface (planar surface A of the anode face 22) for forming the apertures 60 and 70. Specifically, the respective apertures 60 and 70 are formed solely through the planar surface A, and are not required to pass through any elevation changes configured on the anode plate 20a such as the elevation changes associated with the support elements 80, 90, 100 and 110.

Figure 5:
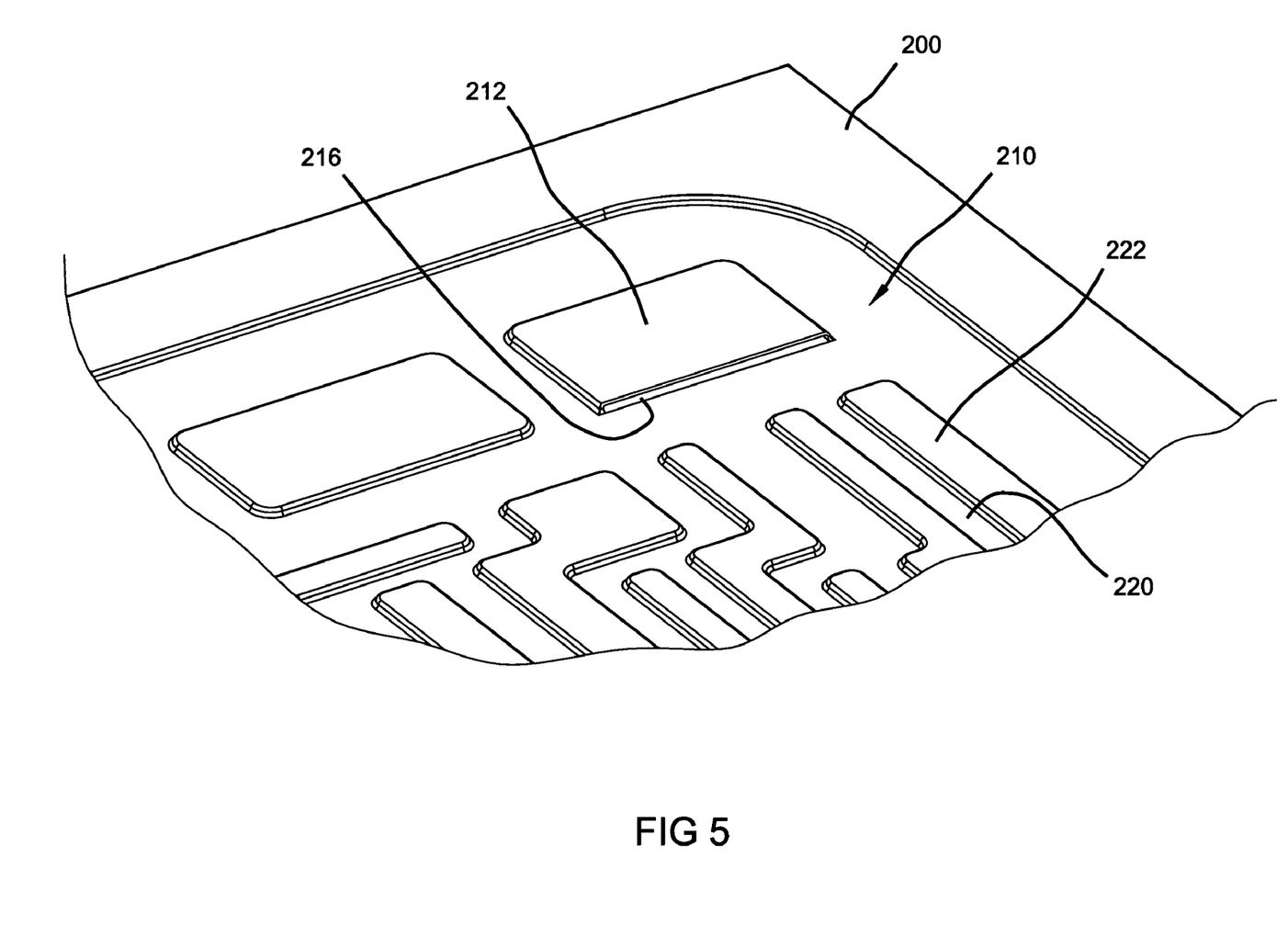
FIG. 5 is a partial perspective view of a separator plate according to additional features of the present invention.

Turning now to FIG. 5, a separator plate 200 according to a further embodiment is shown. The separator plate 200 includes an inlet region 210 having a first support structure 212 and a flow field 220 defined by lands 222. The first support structure 212 incorporates a passage 216 at a forward edge for communicating reactant gas therethrough and toward the flow field 220. It is appreciated that the first support structure 212 may also be incorporated at an outlet region and a passage incorporated thereat for communicating reactant gas from a flow field and away from the plate 200.

The forming of the separator plate 200 will now be described. The passage 216 is initially formed in a thin metal sheet by any suitable manufacturing step such as laser cutting for example. The lands 222 of the flow field 220 and respective support structure are subsequently formed in the metal sheet during a metal forming operation such as stamping or any other suitable process for shaping sheet metal. The creation of the lanced slot and forming of the support structure can be done simultaneously or separately using a slitting operation and then a forming operation or vice versa.

Those skilled in the art can now appreciate from the foregoing description that the broad teachings of the present invention can be implemented in a variety of forms. For example, while the discussion herein is directed to an inlet and outlet region of an anode plate, the same may be applied to any separator plate incorporated in a fuel cell such as a cathode plate for example. Likewise, the inlet features can be used as outlet features and vice versa. Moreover, while the inlet and outlet apertures 60 and 70 are shown arranged in a linear pattern, other patterns may be employed such as, but not limited to, staggered, for example. Therefore, while this invention has been described in connection with particular examples thereof, the true scope of the invention should not be so limited since other modifications will become apparent to the skilled practitioner upon a study of the drawings, the specification and the following claims.

What is claimed is:

1. A separator plate for a PEM fuel cell comprising:
   a one-piece metal plate member having an inlet header, an outlet header, and a flow field therebetween;
   a first aperture of said inlet header and a second aperture of said outlet header operable to receive a fluid therethrough, said first and second apertures formed entirely through said metal plate member and each having a perimeter with a constant first elevation;
   a series of first support elements proximate said first aperture and extending from a first plane to a second elevation defining a second plane;
   a second support element located proximate said first aperture and extending from said first plane to said second plane, said second support element bounding said first aperture in a first, second and third direction such that fluid is directed in a fourth direction between said series of first support elements toward said flow field;
   a series of third support elements proximate said second aperture and extending from said first plane to said second plane;
   a fourth support element located proximate said second aperture and extending from said first plane to said second plane, said fourth support element bounding said second aperture in said second, third and fourth direction such that fluid is directed in said first direction toward said second aperture, wherein said fourth support element includes a plurality of finger portions extending toward said second aperture; and
   wherein said first aperture is located between said series of first support elements and said second support element and said second aperture is located between said series of third support elements and said fourth support element.

2. The separator plate of claim 1, wherein said inlet header includes a series of first apertures and said outlet header includes a series of second apertures.

3. The separator plate of claim 2, wherein said second support element extends adjacent to said series of first apertures and said fourth support element extends adjacent to said series of second apertures.

4. The separator plate of claim 2, wherein said series of first and third support elements are arranged in a generally linear pattern along said first plane and said first and second series of apertures are arranged in a generally linear pattern along said first plane and parallel to said series of first and third support elements respectively.

5. The separator plate of claim 2, wherein fluid flows from said flow field to said series of second apertures between said series of third support elements.

6. A separator plate for a PEM fuel cell comprising:
   a one-piece metal plate member having an inlet header, an outlet header, and a flow field therebetween;
   an inlet aperture of said inlet header and an outlet aperture of said outlet header operable to receive a fluid therethrough, said inlet and outlet apertures each formed entirely through said metal plate member from a lower surface of said metal plate member to an upper surface of said metal plate member, wherein said inlet and outlet apertures each have a first boundary on said upper surface and a second boundary on said lower surface, wherein said first boundary is entirely coplanar and said second boundary is entirely coplanar;
   a series of first support elements proximate said inlet aperture and extending from a first plane having a first elevation to a second plane having a second elevation, said series of first support elements directing fluid towards said flow field;
   a second support element located proximate said inlet aperture and extending from said first plane to said second plane, said second support element bounding said inlet aperture in a first, second and third direction such that fluid is directed in a fourth direction toward said series of first support elements;
   a series of third support elements proximate said outlet aperture and extending from said first plane to said second plane;
   a fourth support element located proximate said outlet aperture and extending from said first plane to said second plane, said fourth support element bounding said second aperture in said second, third and fourth direction such that fluid is directed in said first direction toward said outlet aperture, wherein said fourth support element includes a plurality of finger portions extending toward said outlet aperture; and
   wherein said inlet aperture is located between said series of first support elements and said second support element and said outlet aperture is located between said series of third support elements and said fourth support element.

7. The separator plate of claim 6, wherein said inlet header includes a series of inlet apertures and said outlet header includes a series of outlet apertures.

8. The separator plate of claim 7, wherein said second support element extends adjacent said series of inlet apertures and said fourth support element extends adjacent said series of outlet apertures.

9. The separator plate of claim 7, wherein said series of first and third support elements are arranged in a generally linear pattern along said first plane and said series of inlet and outlet apertures are arranged in a generally linear pattern along said first plane and parallel to said series of first and third support elements respectively.

10. The separator plate of claim 7, wherein fluid flows from said flow field to said series of outlet apertures between said series of third support elements.

11. A separator plate for a PEM fuel cell comprising:
   a one-piece metal plate member having an inlet header, an outlet header, and a flow field therebetween;

said inlet header having a series of first support elements, a second support element and an inlet aperture therebetween;

said outlet header having a series of third support elements, a fourth support element and an outlet aperture therebetween;

wherein said first and second support elements extend from a first plane at a first elevation to a second plane having a second elevation, said second support element bounding fluid from said inlet aperture in a first, a second and a third direction such that fluid is directed in a fourth direction toward said series of first support elements;

wherein said third and fourth support elements extend from said first plane to said second plane, said fourth support element having a plurality of finger portions extending toward said outlet aperture, said fourth support element bounding fluid in said second, third and fourth directions such that fluid is directed in said first direction toward said outlet aperture; and wherein said inlet and outlet apertures extend entirely through said metal plate member from a lower surface of said metal plate member to an upper surface of said metal plate member, said inlet and outlet apertures having a first boundary on said upper surface and a second boundary on said lower surface, said first boundary being entirely coplanar and said second boundary being entirely coplanar.

12. The separator plate of claim 11, wherein said inlet header includes a series of inlet apertures and said outlet header includes a series of outlet apertures.

13. The separator plate of claim 12, wherein said second support element extends adjacent said series of inlet apertures and said fourth support element extends adjacent said series of outlet apertures.

14. The separator plate of claim 12, wherein said series of first and third support elements are arranged in a generally linear pattern along said first plane and said series of inlet and outlet apertures are arranged in a generally linear pattern along said first plane and parallel to said series of first and third support elements respectively.

15. The separator plate of claim 12, wherein fluid flows from said flow field to said series of outlet apertures between said series of third support elements.

* * * * *